Dec. 6, 1949     H. NEUWIRTH     2,490,369
TRIPOD LEG
Filed July 18, 1946
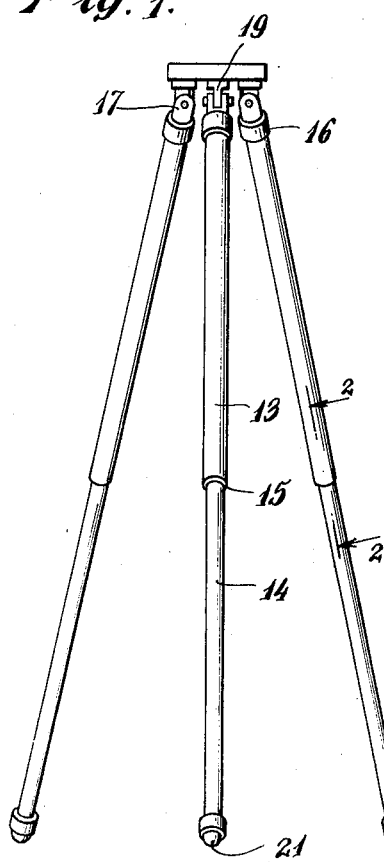
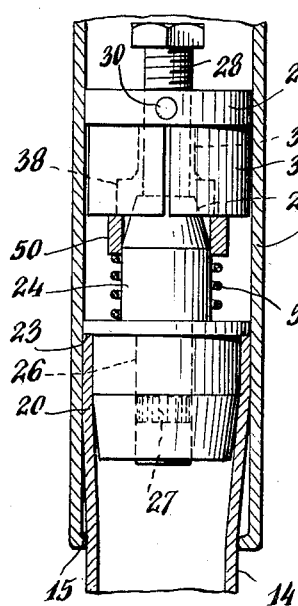
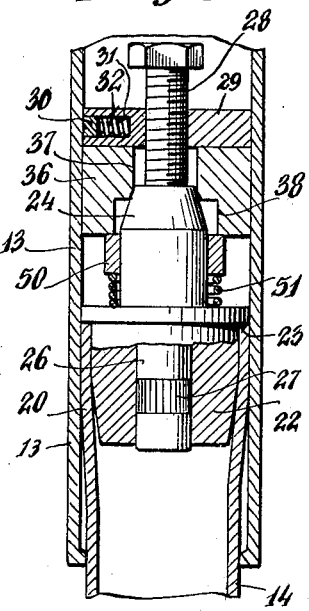
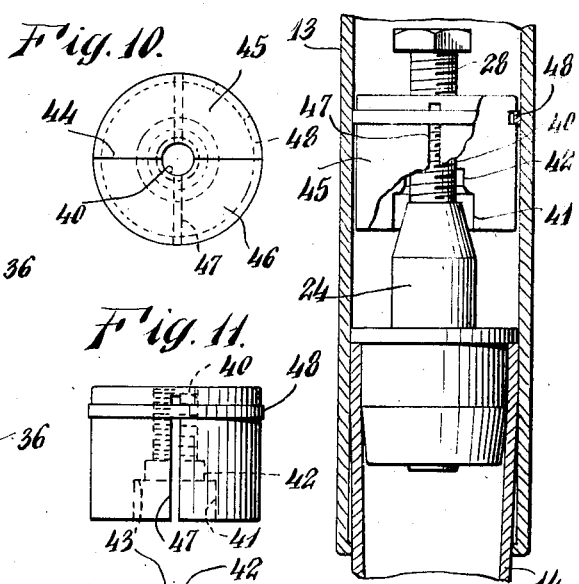
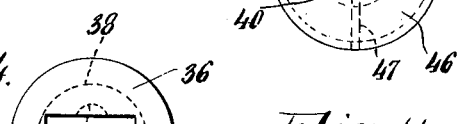
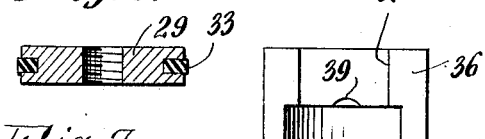
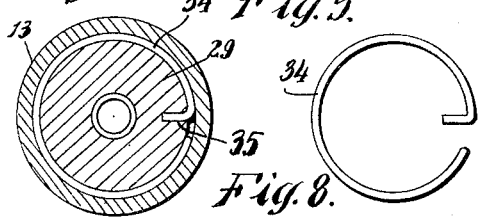
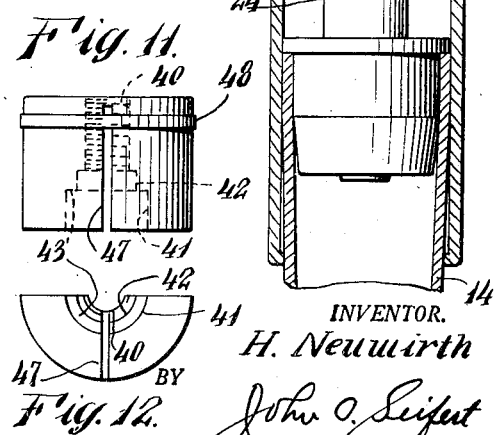
INVENTOR.
H. Neuwirth
BY John O. Seifert
ATTORNEY Patented Dec. 6, 1949

2,490,369

UNITED STATES PATENT OFFICE 2,490,369

TRIPOD LEG

Herman Neuwirth, Brooklyn, N. Y., assignor to Testrite Instrument Co., Inc., New York, N. Y., a corporation of New York Application July 18, 1946, Serial No. 684,492

5 Claims. (Cl. 248—191)

This invention relates to tripods having legs consisting of tubular telescoping sections to adjust the legs to different lengths and position the tripod head at different heights, and relates particularly to means for releasably locking the leg sections in adjusted position.

It is the object of the invention to provide improved means for releasably locking the telescoping sections of a tripod leg in adjusted position, comprising laterally expansible and contractible shoes carried at the end of a telescoping leg section to be disposed in an outer leg section to have sliding movement therein by the telescoping movement of the leg sections, and said telescoping leg section also carrying means operative by rotative movement of the telescoping leg section in one direction when the leg sections have been adjusted to desired position to expand the shoes into and retain them in frictional locking engagement with the outer leg section, and said shoes adapted to release said leg sections to have telescoping movement by rotative movement of the telescoping leg section in the opposite direction and thereby permitting the shoes to assume contracted position out of frictional locking engagement with the outer leg section.

In the drawing accompanying and forming a part of this application Figure 1 is an elevational view of a tripod having tubular telescoping leg sections and showing the one section of the legs adjusted longitudinally outward from the other leg section to an extent to support the tripod head at a predetermined height.

Figure 2 is a longitudinal sectional view of a tripod leg, the section being taken substantially on the line 2—2 of Figure 1 and showing the means for releasably locking the leg sections adjusted to unlocking position.

Figure 3 is a view similar to Figure 2 but showing the leg sections locked in adjusted position.

Figure 4 is a plan view of a segmental locking shoe.

Figure 5 is a side elevation of the shoe shown in and looking at the bottom of Figure 4.

Figure 6 is a sectional view of an abutment of the means for locking the leg sections against telescoping movement adapted to engage in the outer leg section and showing the same arranged with yielding means for frictionally engaging the leg section and holding the abutment against rotation while permitting of sliding movement of the abutment in said leg section.

Figure 7 is a plan view of the abutment and showing the same arranged with modified yielding means to frictionally engage the outer leg section and hold the abutment against rotation while permitting of sliding movement thereof in said leg section.

Figure 8 is a plan view of the yielding means shown in Figure 7 in connection with the abutment for frictionally engaging the outer leg section and holding the abutment against rotation therein.

Figure 9 is a view similar to Figure 2 showing a modified construction and arrangement of expansible and contractible shoes for locking tripod leg sections against telescoping movement.

Figure 10 is an end view of the shoes shown in Figure 9 for releasably locking the leg sections against telescoping movement and showing the same in contracted position.

Figure 11 is a side elevation of the locking shoes shown in Figure 10 looking at the bottom of said figure; and Figure 12 is an end elevation of one of the segmental locking shoes shown in and looking at the top of Figure 11.

In carrying out the invention there is provided tubular leg sections 13, 14, the section 13 being of larger diameter than the section 14. The leg section 13 is arranged at one end with an inwardly extending annular shoulder of a diameter for the sliding engagement of the leg section 14, and shown by flanging the end of the leg section 13 inwardly, as shown at 15 in Figures 2 and 3. In assembling the leg sections the section 14 is engaged into the end of the section 13 opposite the end from which the leg section 14 is to be extended, and to prevent the section 14 from moving out from the end of the leg section 13 the end of the section 14 within the section 13 is expanded to a diameter to have sliding engagement with the inner surface of the section 13 and of a diameter greater than the diameter of the flange 15 in a manner as hereinafter described and as shown at 20 in Figures 2 and 3. A cap 16 is secured upon the end of the leg section 13 opposite the end from which the leg section 14 extends, and said cap is provided with an outwardly extending bifurcation 17, whereby it is pivotally connected to the head 18 of the tripod by engaging the bifurcation legs at opposite sides of an ear 19 extended from the bottom of the head 18 and pivotally connecting the same by a pivot pin extended through registered openings in the bifurcation legs and ear, the tripod as shown being provided with three legs, and the sections 14 having feet of friction material, such as rubber, secured to the end thereof by perforated caps, as at 21.

The means for releasably locking the leg sections in adjusted position, as shown in Figures 2 to 5, is connected to and extends from the end of the telescoping leg section 14 to be disposed within the leg section 13, and as shown is carried by a plug or block 22 having a driving fit into the end of the leg section 13, the outer surface of the plug being slightly tapered whereby the end of the section 14 is expanded, as at 20, for engagement of the flange 15 of the leg section 13 and prevent the leg section 14 from moving out from the leg section 13. The plug 22 has an annular laterally extending flange at one end to engage at the end of the leg section 14, as at 23.

The locking means proper comprises a conical member or head 24, which may be of truncated conical form, arranged at the end of a portion 25 of uniform diameter having a portion 26 of reduced diameter extending from the end opposite the conical head having a driving fit in a bore axially of the plug 22 and whereby it is mounted at the end of the leg section 14 within the leg section 13 to participate in sliding movement and rotation of the leg section 14, the extension 26 having an intermediate portion provided with flutes or serrations 27 spaced about and extending longitudinally of the extension 26 and adapted to be seated in the wall of the bore in the plug 22 when driven therein and hold the same with the conical head against rotation relative to the plug 22 and leg section 14. The conical head is provided with a screw threaded stem extending from the apex thereof, and while this stem may be integral with the conical head as shown it consist of a headed screw 28 threaded into an opening in the end or apex of the conical head. An abutment is adjustably mounted on the threaded stem to have movement toward and away from the conical head, and as shown may consist of a disk 29 having a screw threaded axial opening for the threaded engagement of the stem. The disk abutment loosely engages in the leg section 13, and to hold the abutment against rotation by the rotation of the conical head to screw the stem into the disk opening and move the disk toward the conical head, the disk is provided with means to frictionally contact the inner surface of the leg section 13 and hold the disk against rotation while permitting of sliding movement of the abutment disk in said leg section. As shown in Figures 2 and 3 this means consists of a plug 30 slidably mounted in a recess 31 extended radially into the periphery of the disk and a spring 32 confined between said plug 30 and the bottom of the recess yieldingly urging the plug 30 outwardly from the recess into engagement with the leg section 13 with sufficient force to frictionally hold the disk against rotation by the rotation of the screw threaded stem with the conical head. As shown in Figure 6 the means carried by the disk abutment and frictionally engaging the leg section 13 to hold the disk against rotation consists of a ring or band of resilient friction material, such as rubber, engaged in and projecting from an annular recess in the periphery of the disk, as at 33. As shown in Figures 7 and 8 this means for frictionally engaging the leg section 13 and holding the disk 29 against rotation with the threaded stem consists of a split ring 34 of resilient material, such as wire, engaging in an annular recess in the periphery of the disk 29, and having one end bent laterally and engaged in a socket in the bottom wall of the recess, as at 35, to anchor said ring to the disk, the opposite end portion of said ring being free and yieldingly urged outwardly into frictional engagement with the wall of the leg section 13 under the inherent resiliency of the material thereof.

Laterally expansible and contractible shoes in the form of segments 36, and shown as two in number, although a greater number may be utilized, are disposed about the stem and conical head at the juncture thereof between the abutment 29 and the conical surface of the head. The outer surface of the shoe segments is an arc having a radius less than the inner diameter of the tubular section 13 and in the contracted position thereof may contact the inner surface of the leg section 13 with a light force, whereby the shoes with the leg section 14 are adapted to have sliding movement relative to the leg section 13. The leg sections 14 are normally adjusted into the leg sections 13 and locked in said position, and in the use of the tripod the locking means is released and the leg sections 14 adjusted outwardly from the leg sections 13 to the desired extent and releasably locked in said position. By the arrangement of threading the disk abutment 29 onto the threaded stem 28 by turning or imparting rotative movement in one direction, as to the right, to the leg section 13 the stem will be threaded into the disk 29 causing the disk 29 and conical head to move toward each other and this movement of the conical head will engage the head with and expand the shoe segments into and retain them in frictional locking engagement with the inner surface of the leg section 13 and locking the telescoping leg sections against telescoping movement. To unlock and release the leg sections for telescoping adjustment rotative movement is imparted to the leg section 14 in the opposite direction, as to the left, this rotative movement of the leg section 14 causing the stem to be screwed out of the disk abutment 29 and said disk and the conical head to move away from each other and the shoe segments, thereby permitting the shoe segments to assume contracted position and move out of locking engagement with the tube section 13 when the leg section 14 may be adjusted into the leg section 13 and the leg sections locked together in said position.

To facilitate the expanding of the shoe segments by the conical head each of the shoe segments has an elongated angular recess in the inner face extending inward from the one end of the shoe segment to be disposed next to the abutment disk 29, as at 37, which recesses when the shoes are disposed in opposed or mating relation will engage at diametrically opposite sides of the threaded stem 28. An arcuate recess 38 in the inner face of the shoe segments is extended into the opposite end of the shoe segments and is of greater dimension or depth than the angular recess 37, the bottom wall of the recesses 37 thereby forming with the end wall of the recesses 38 an angle, as at 39, which angle, or a portion intermediate the ends thereof shaped to conform to the tapering face of the conical head, is adapted to engage with the conical head as the shoes are engaged by and expanded into frictional locking engagement with the leg section 13.

To support the shoes in predetermined relation to the conical head an annulus 50 is loosely engaged upon the conical head at the end of the shoes opposite the abutment disk 29, and said annulus yieldingly supporting and urging the shoes toward the abutment disk 29 by a spring 51 coiled about the base portion 25 of uniform diameter of the head and confined between the plug 22 and the annulus 50.

In Figures 9 to 12, inclusive, there is shown a modified construction and arrangement of expansible and contractible shoes for locking the leg sections against telescoping adjustment. The shoes are constructed from a cylindrical block of a diameter slightly less than the inner diameter of the leg section 13 and having the outer surface arranged with parallel flutes or serrations extending longitudinally of and spaced about the block. The block is provided with an axial bore having different diameters, the diameter of the bore portion extending into one end of the block being of a diameter and screw threaded the same as the stem 28, as shown at 40 in Figure 11, and extending for approximately one-half the length of the block. The portion of the bore extended into the opposite end of the block is of increased diameter, as at 41, and the intermediate portion of the bore, as at 42, is of less diameter than the portion 41 and of greater diameter than the screw threaded portion 40 and forming with the end wall of the bore portion 41 an angle 43.

The block is slitted diametrically, as at 44, to separate the block into two shoes or segments of substantially semi-circular form 45, 46, and each of said segments slitted longitudinally intermediate the side edges, as at 47, said slits extending from the end of the block or segments into which the bore portion 41 is extended to a point within the opposite end of the segments, and thus arranging each of said shoes or segments with a pair of flexible laterally expansible and contractible portions.

The shoes 45, 46 are disposed about the stem 28 and conical head 24 at the juncture thereof with the end of the shoes into which the bore portion 41 and the slit 47 is extended opposed to the conical head. The block from which the shoes 45, 46 are formed as well as said shoes when assembled is of a diameter less than the internal diameter of the leg section 13 and permits of sliding movement of the shoes in said leg section, and which also retains the shoes in position with the screw thread on the bore portion 40 engaging the screw thread of the stem and the angle 43 engaging the portion of the conical head within the end thereof. The shoes are expanded into frictional locking engagement with the leg section 13 by turning or rotating the telescoping leg section 14 in one direction, as to the right, causing the shoes and the conical head to move toward each other and the conical head to expand the shoes into locking engagement with the leg section 13. The leg sections are released to effect telescoping adjustment thereof by rotating the leg section 14 in the opposite direction, as to the left, causing the shoes and conical head to move away from each other and the shoes to assume position out of locking engagement with the leg section 13. While it is not essential to the operation of the locking means the shoes may be yieldingly retained in opposed relation with the threaded bore portion 40 engaging the screw thread on the stem 28 by a resilient split ring 48 engaging in a recess disposed about the shoe segments within the end having the bore sections or recesses 40. In this arrangement as the telescoping leg section is turned or rotated in one direction, as to the right, the conical head 24 and shoes 45, 46 will be caused to move toward each other and the conical head engaging the shoulder 43 will expand the shoes into and retain them in frictional locking engagement with the leg section 13 securing the leg sections against telescoping movement, the expanding movement of the shoes also expanding the split ring. To release the leg sections to permit of telescoping movement of the same, the leg section 14 is turned or rotated in the opposite direction, as to the left, thereby causing the conical head and shoes 45, 46 to move away from each other and the shoes are moved out of locking engagement with the leg section 13 by the split ring.

The screw threaded stem 28 may be constructed integral with the conical head and arranged with a head 52 for engagement of and prevent the abutment disk 29 and shoes 45, 46 to be moved out of engagement with and off from the stem should the leg section 14 be rotated to such an extent as to cause said abutment disk 29 and shoes 45, 46 to move off from the stem. Or the stem 28 may consist of a headed screw threaded into a socket extended into the apex of the conical head.

Having described my invention, I claim:

1. In a tripod leg including telescoping sections, means for releasably locking the leg sections against telescoping movement, comprising a conical head secured at the base in the end of the telescoping leg section disposed in the outer leg section and having a screw threaded stem extending axially from the apex thereof, an abutment having threaded connection with the stem, means carried by the abutment frictionally engaging the outer leg section and holding the abutment against rotation while permitting of sliding movement of the abutment therein, and laterally expansible and contractible segments disposed about the stem and conical head and confined between the conical head and abutment, the outer surface of said segments being in an arc having a radius less than the internal diameter of and to permit of sliding movement of the segments in the outer leg section, the rotative movement of the telescoping leg section in one direction causing the head in cooperation with the abutment to expand the segments into frictional locking engagement with the outer leg section, and rotation of the telescoping leg section in the opposite direction causing the head and abutment to move away from each other and permit the segments to move out of locking engagement with the outer leg section and release the leg sections to have telescoping adjustment.

2. A tripod leg including telescoping sections as claimed in claim 1, wherein the segments have an angular recess in the inner surface at one end portion and an arcuate recess in said surface of the segments at the opposite end portion of greater dimension than the angular recess and forming a shoulder between the recesses, said angular recesses adapted to be disposed relative to the threaded stem and the arcuate recess portion relative to the conical head and the tapering surface of the head adapted to engage the shoulder between the recesses and expand the segments into locking engagement with the outer leg section.

3. A tripod leg including telescoping sections as claimed in claim 1, wherein the abutment is in the form of a disk and the yielding means carried by the abutment frictionally engaging the outer leg section to hold the abutment against rotation and permit of sliding movement of the abutment in the outer leg section consists of a plug slidably mounted in a recess in the periphery of the disk and a spring yieldingly urging the plug outward from said recess and said plug adapted to be moved into the disk recess by the engagement of the disk into the outer leg section and yieldingly urged outwardly from the disk recess into engagement with the outer leg section.

4. A tripod leg including telescoping sections as claimed in claim 1, wherein the abutment is in the form of a disk, and the means carried by the abutment to frictionally engage and retain the abutment against rotation while permitting sliding movement of the abutment in the outer leg section comprises a resilient split ring member engaged in an annular recess in the periphery of the disk and having one end anchored to the disk and the other end free and adapted by the resiliency thereof to frictionally engage the outer leg section.

5. A tripod leg including telescoping sections as claimed in claim 1, wherein the abutment is in the form of a disk, and the means carried by the abutment to frictionally engage and hold the abutment against rotation while permitting sliding movement thereof in the outer leg section, comprises a band of resilient friction material seated in an annular recess in the periphery of the disk and adapted to frictionally engage the inner surface of the outer leg section.

HERMAN NEUWIRTH.

REFERENCES CITED

The following references are of record in the file of this patent:

UNITED STATES PATENTS

| Number | Name | Date |
|---|---|---|
| 2,019,753 | Wittel | Nov. 5, 1935 |
| 2,290,400 | Wirgin | July 21, 1942 |
| 2,298,380 | Hood | Oct. 13, 1942 |

FOREIGN PATENTS

| Number | Country | Date |
|---|---|---|
| 718,486 | France | Nov. 4, 1931 |